United States Patent
Jeong et al.

(10) Patent No.: US 10,306,919 B2
(45) Date of Patent: Jun. 4, 2019

(54) LYOCELL MATERIAL FOR CIGARETTE FILTER AND METHOD FOR PREPARING SAME

(71) Applicants: KOLON INDUSTRIES, INC., Gwacheon-si, Gyeonggi-do (KR); KT&G CORPORATION, Daejeon (KR)

(72) Inventors: Jong Cheol Jeong, Yongin-si (KR); Sang Woo Jin, Yongin-si (KR); Sang Mok Lee, Yongin-si (KR); Woo Chul Kim, Yongin-si (KR); Sang Yoel Lee, Yongin-si (KR); Jong Yeol Kim, Daejeon (KR); Soo Ho Kim, Daejeon (KR); Bong Su Cheong, Daejeon (KR); Hyun Suk Cho, Daejeon (KR); Sung Jong Ki, Daejeon (KR)

(73) Assignees: KOLON INDUSTRIES, INC., Seoul (KR); KT&G CORPORATION, Daejeon (KR)

( * ) Notice: Subject to any disclaimer, the term of this patent is extended or adjusted under 35 U.S.C. 154(b) by 282 days.

(21) Appl. No.: 15/024,936

(22) PCT Filed: Sep. 26, 2014

(86) PCT No.: PCT/KR2014/009006
§ 371 (c)(1),
(2) Date: Mar. 25, 2016

(87) PCT Pub. No.: WO2015/046943
PCT Pub. Date: Apr. 2, 2015

(65) Prior Publication Data
US 2016/0235112 A1 Aug. 18, 2016

(30) Foreign Application Priority Data

Sep. 26, 2013 (KR) .................... 10-2013-0114536
Dec. 26, 2013 (KR) .................... 10-2013-0163793
Sep. 25, 2014 (KR) .................... 10-2014-0128163

(51) Int. Cl.
| | | |
|---|---|---|
| A24D 3/02 | (2006.01) |
| B29C 48/00 | (2019.01) |
| A24D 3/10 | (2006.01) |
| D01D 1/02 | (2006.01) |
| D01F 2/00 | (2006.01) |
| A24D 3/06 | (2006.01) |
| D01D 5/06 | (2006.01) |
| D01D 10/06 | (2006.01) |
| D02G 1/00 | (2006.01) |
| B29K 1/00 | (2006.01) |
| B29L 31/14 | (2006.01) |
| B29L 31/00 | (2006.01) |

(52) U.S. Cl.
CPC .......... *A24D 3/0204* (2013.01); *A24D 3/067* (2013.01); *A24D 3/068* (2013.01); *A24D 3/10* (2013.01); *B29C 48/0019* (2019.02); *B29C 48/022* (2019.02); *D01D 1/02* (2013.01); *D01D 5/06* (2013.01); *D01D 10/06* (2013.01); *D01F 2/00* (2013.01); *D02G 1/00* (2013.01); *B29K 2001/12* (2013.01); *B29L 2031/14* (2013.01); *B29L 2031/7416* (2013.01); *D10B 2201/28* (2013.01); *D10B 2503/00* (2013.01)

(58) Field of Classification Search
CPC ...... A24D 3/0204; A24D 3/068; A24D 3/067; A24D 3/10; B29C 47/0004; B29C 47/0059; D01D 5/06; D01D 10/06; D01D 1/02; D02G 1/00; D01F 2/00; B29L 2031/14; B29L 2031/7416; D10B 2201/28; D10B 2503/00; B29K 2001/12
See application file for complete search history.

(56) References Cited

U.S. PATENT DOCUMENTS

| | | | | |
|---|---|---|---|---|
| 3,408,713 A | * | 11/1968 | Parker ................. | A24D 3/0204 264/168 |
| 4,246,221 A | | 1/1981 | McCorsley, III | |
| 4,416,698 A | * | 11/1983 | McCorsley, III ........ | C08J 3/096 106/200.2 |
| 5,063,945 A | * | 11/1991 | Sugihara ................. | A24D 3/08 131/332 |
| 5,591,388 A | * | 1/1997 | Sellars ..................... | D01F 2/00 264/143 |

(Continued)

FOREIGN PATENT DOCUMENTS

| | | |
|---|---|---|
| CN | 1063929 C | 4/2001 |
| DE | 10053359 A1 | 5/2002 |

(Continued)

OTHER PUBLICATIONS

Bajaj, P., "Spin Finishes for Manufactured Fibres;" Manufactured Fibre Technology; Chapter 7 ; pp. 140 and 145 (Chapman & Hall, London; 1997).*
European Patent Office, Communication dated Sep. 8, 2017, issued in counterpart European Application No. 14848075.9.
International Searching Authority, International Search Report for PCT/KR2014/009006 dated Nov. 21, 2014.

(Continued)

*Primary Examiner* — Christopher T Schatz
*Assistant Examiner* — Cynthia L Schaller
(74) *Attorney, Agent, or Firm* — Sughrue Mion, PLLC

(57) ABSTRACT

Disclosed are a lyocell material for a cigarette filter and a method of preparing the same, wherein a crimped tow is manufactured using a lyocell multifilament including low-strength lyocell monofilaments, and thus the ultimately prepared lyocell material for a cigarette filter can exhibit low strength, thereby increasing processing efficiency during the manufacture of the cigarette filter.

16 Claims, No Drawings

(56) References Cited

U.S. PATENT DOCUMENTS

| | | | | |
|---|---|---|---|---|
| 5,968,434 A | * | 10/1999 | Zikeli | C08J 5/18 264/187 |
| 2002/0037407 A1 | * | 3/2002 | Luo | D01D 5/14 428/364 |
| 2005/0019564 A1 | * | 1/2005 | Kwon | D01F 2/00 428/364 |
| 2005/0287368 A1 | * | 12/2005 | Corallo | A24D 3/10 428/375 |
| 2005/0288163 A1 | | 12/2005 | Caenen et al. | |
| 2009/0127750 A1 | | 5/2009 | Bhushan et al. | |
| 2011/0094526 A1 | * | 4/2011 | Marshall | D01F 2/00 131/332 |

FOREIGN PATENT DOCUMENTS

| | | |
|---|---|---|
| EP | 2 589 689 A2 | 5/2013 |
| JP | 9509987 A | 10/1997 |
| JP | 10-505886 A | 6/1998 |
| JP | 2013507949 A | 3/2013 |
| KR | 10-0875789 B1 | 12/2008 |
| RU | 2106790 C1 | 3/1998 |
| WO | 94/27903 A1 | 12/1994 |
| WO | 95/14398 A1 | 6/1995 |
| WO | 95/24520 A1 | 9/1995 |
| WO | 2011048397 A1 | 4/2011 |
| WO | 2012004583 A1 | 1/2012 |

OTHER PUBLICATIONS

Russian Patent Office; Communication dated Apr. 12, 2017, issued in the corresponding Russian Patent Application No. 2016116012/05.

Japanese Patent Office; Communication dated Mar. 27, 2017 in counterpart application No. 2016-516966.

The State Intellectual Property Office of the P.R.C., Communication dated Dec. 27, 2016, issued in corresponding Chinese Application No. 201480053612.5.

Japanese Patent Office communication dated Nov. 29, 2017 in counterpart application No. 2016-516966.

* cited by examiner

LYOCELL MATERIAL FOR CIGARETTE FILTER AND METHOD FOR PREPARING SAME

CROSS REFERENCE TO RELATED APPLICATIONS

This application is a National Stage of International Application No. PCT/KR2014/009006 filed Sep. 26, 2014, claiming priority based on Korean Patent Application Nos. 10-2013-0114536 filed Sep. 26, 2013, 10-2013-0163793 filed Dec. 26, 2013, and 10-2014-0128163 filed Sep. 25, 2014, the contents of all of which are incorporated herein by reference in their entirety.

TECHNICAL FIELD

The present invention relates to a lyocell material for a cigarette filter and a method of preparing the same.

BACKGROUND ART

Most cigarette filters are composed of cellulose acetate fibers. Cellulose acetate fibers are prepared as follows. Specifically, cellulose acetate flakes are dissolved in a solvent such as acetone, thus obtaining a cellulose acetate spinning dope. The spinning dope is fed to a spinning nozzle device and is then spun using a drying spinning process in a high-temperature atmosphere, yielding cellulose acetate fibers.

In order to facilitate the manufacture of a cigarette filter, the cellulose acetate fibers for use in a cigarette filter have an overall fineness that is appropriately set and are provided in the form of a crimped tow. Then, the cigarette filter is manufactured in a manner in which the crimped tow made of cellulose acetate fibers is opened using a cigarette filter plug winding device, impregnated with a plasticizer, formed in a rod shape using a filter winding paper, and then cut to a predetermined length.

Cellulose acetate results from subjecting cellulose to acetic acid esterification, and is inherently biodegradable. However, cellulose acetate is not regarded as having sufficient biodegradability to solve environmental problems, which are recently on the rise.

For example, in the case where cigarette filters made of cellulose acetate fibers are buried in soil, the original shape thereof is still maintained for 1 to 2 years, and a considerably long period of time is required to completely biodegrade the cigarette filters buried in soil.

A cigarette filter is assembled into a cigarette product and thus distributed to consumers and provided for smoking, and is ultimately discarded after smoking. Also, cigarette filter material may be directly wasted as fabrication residue from cigarette filter manufacturing plants. Such cigarette filter waste is collected and treated by being buried. Furthermore, cigarette butts are not recovered as waste, but remain in the natural environment. Problems due to cigarette filter waste include not only visual quality problems but also the leaching of toxic chemicals, adsorbed by used cigarette filters, into the environment, thus entailing a potential biological risk.

To respond to such circumstances, a variety of methods have been devised for manufacturing biodegradable cigarette filters. Such methods include the addition of an additive for increasing the rate of degradation of cellulose acetate comprising a biodegradable polymer, the use of cellulose acetate having a low degree of substitution to increase biodegradability, and the use of a polymer composite having high biodegradability, such as PHB (poly-hydroxybutyrate)/PVB (polyvinyl butyral) and starch, as a filter tow material.

However, satisfactory commercial solutions for producing filters that are acceptable to consumers while degrading quickly enough to overcome waste problems have not yet been suggested. The reason is that methods for achieving a rate of biodegradation fast enough to solve environmental problems while still satisfying the tobacco flavor characteristics and absorption profiles of cigarette filters when smoked have not yet been realized.

In the case where a cigarette filter is manufactured using a crimped tow as a material therefor, when the crimped tow has high strength, cuttability deteriorates in the cutting process, and the cut section becomes poor, undesirably resulting in low filter preparation yield and a low production rate.

Accordingly, there is need to develop techniques for materials for cigarette filters having superior biodegradability and high processing efficiency in the manufacture of cigarette filters.

DISCLOSURE

Technical Problem

Therefore, the present invention is intended to provide a lyocell material for a cigarette filter, which has superior biodegradability and may increase processing efficiency in the manufacture of a cigarette filter, and a method of preparing the same.

Technical Solution

A first embodiment of the present invention provides a method of preparing a lyocell material for a cigarette filter, comprising: (S1) spinning a lyocell spinning dope including cellulose pulp and an N-methylmorpholine-N-oxide (NMMO) aqueous solution, in which the concentration of the cellulose pulp is 8 to ii %; (S2) coagulating the lyocell spinning dope spun in (S1), thus obtaining a coagulated lyocell multifilament; (S3) water-washing the lyocell multifilament coagulated in (S2); (S4) oil-treating and drying the lyocell multifilament water-washed in (S3); and (S5) crimping the lyocell multifilament oil-treated in (S4), thus preparing a crimped tow, wherein (S1) to (S5) are performed so that the crimped tow has a tensile strength of 1 to 2 g/d.

A second embodiment of the present invention provides a method of preparing a lyocell material for a cigarette filter, comprising: (S1) spinning a lyocell spinning dope including cellulose pulp and an N-methylmorpholine-N-oxide (NMMO) aqueous solution, in which the concentration of the cellulose pulp is 8 to ii %; (S2) coagulating the lyocell spinning dope spun in (S1), thus obtaining a coagulated lyocell multifilament; (S3) water-washing the lyocell multifilament coagulated in (S2); (S4) oil-treating and drying the lyocell multifilament water-washed in (S3); and (S5) crimping the lyocell multifilament oil-treated in (S4), thus preparing a crimped tow, wherein (S1) to (S4) are performed so that monofilaments for the lyocell multifilament obtained in (S4) have a strength of 2.0 to 3.5 g/d.

In the first and second embodiments, the cellulose pulp in (S1) may include 85 to 97 wt % of alpha-cellulose and may have a degree of polymerization (DPw) of 600 to 1700.

Also, the spinning in (S1) may be performed at 100 to 110° C., and the coagulating in (S2) may include primary coagulation using air quenching (Q/A) by supplying the spun lyocell spinning dope with cold air and secondary coagulation by placing the primarily coagulated spinning dope in a coagulation solution. As such, the air quenching may be performed by supplying the spun lyocell spinning dope with cold air at a temperature of 4 to 15° C. and an air flow rate of 70 to 90 m$^3$/hr. Furthermore, the coagulation solution in the secondary coagulation may have a temperature of 30° C. or less.

Also, (S1) to (S4) may be performed so that the lyocell monofilaments obtained in (S4) have a fineness of 1.0 to 8.0 denier and an elongation of 5 to 13%.

Also, the crimping in (S5) may be performed so as to form 15 to 30 crimps per inch in the lyocell multifilament obtained in (S4). As such, the crimping may be performed by supplying steam to the lyocell multifilament and applying pressure thereto, and particularly, by supplying the lyocell multifilament with steam at a pressure of 0.1 to 1.0 kgf/cm$^2$ and pressing the lyocell multifilament using a press roller at a pressure of 1.5 to 2.0 kgf/cm$^2$.

A third embodiment of the present invention provides a lyocell material for a cigarette filter, which is a crimped tow having a tensile strength of 1 to 2 g/d, obtained by crimping a lyocell multifilament.

A fourth embodiment of the present invention provides a lyocell material for a cigarette filter, which is a crimped tow obtained by crimping a lyocell multifilament comprising lyocell monofilaments having a strength of 2.0 to 3.5 g/d. Here, the lyocell monofilaments may have a fineness of 1.0 to 8.0 denier and an elongation of 5 to 13%. Furthermore, the crimped tow may have a tensile strength of 1 to 2 g/d and an elongation at break of 5 to 7.5%.

In the third and fourth embodiments, the crimped tow may have 15 to 30 crimps per inch.

Advantageous Effects

According to the present invention, a lyocell material for a cigarette filter and a method of preparing the same can be provided, wherein processing efficiency in the manufacture of a cigarette filter can be increased using lyocell, which exhibits superior biodegradability and is thus environmentally friendly.

BEST MODE

Hereinafter, a detailed description will be given of the present invention.

The present invention addresses a method of preparing a lyocell material for a cigarette filter, comprising: (S1) spinning a lyocell spinning dope including cellulose pulp and an N-methylmorpholine-N-oxide (NMMO) aqueous solution, in which the concentration of the cellulose pulp is 8 to 11%; (S2) coagulating the lyocell spinning dope spun in (S1), thus obtaining a coagulated lyocell multifilament; (S3) water-washing the lyocell multifilament coagulated in (S2); (S4) oil-treating and drying the lyocell multifilament water-washed in (S3); and (S5) crimping the lyocell multifilament oil-treated in (S4), thus preparing a crimped tow, wherein (S1) to (S5) are performed so that the crimped tow has a tensile strength of 1 to 2 g/d.

In addition, the present invention addresses a method of preparing a lyocell material for a cigarette filter, comprising: (S1) spinning a lyocell spinning dope including cellulose pulp and an N-methylmorpholine-N-oxide (NMMO) aqueous solution, in which the concentration of the cellulose pulp is 8 to ii %; (S2) coagulating the lyocell spinning dope spun in (S1), thus obtaining a coagulated lyocell multifilament; (S3) water-washing the lyocell multifilament coagulated in (S2); (S4) oil-treating and drying the lyocell multifilament water-washed in (S3); and (S5) crimping the lyocell multifilament oil-treated in (S4), thus preparing a crimped tow, wherein (S1) to (S4) are performed so that monofilaments for the lyocell multifilament obtained in (S4) have a strength of 2.0 to 3.5 g/d. Individual steps are specified below.

The two methods according to the present invention are described in detail below.

[(S1)]

(S1) is a step of spinning a lyocell spinning dope including cellulose pulp and an N-methylmorpholine-N-oxide (NMMO) aqueous solution.

The lyocell spinning dope may comprise 8 to 11 wt % of cellulose pulp and 89 to 92 wt % of an N-methylmorpholine-N-oxide aqueous solution, and the cellulose pulp may contain 85 to 97 wt % of alpha-cellulose and have a degree of polymerization (DPw) of 600 to 1700.

If the amount of the cellulose pulp of the spinning dope is less than 8 wt %, it is difficult to realize a fibrous morphology. On the other hand, if the amount thereof exceeds 11 wt %, it is difficult to prepare low-strength fibers. In the case where the resulting fibers are used in the form of a crimped tow in the manufacture of a cigarette filter, it is difficult to cut the filter, and the cut section of the filter may become poor and the rate of production of the cigarette filter may decrease.

In the N-methylmorpholine-N-oxide aqueous solution, the weight ratio of N-methylmorpholine-N-oxide and water may range from 93:7 to 85:15. If the weight ratio of N-methylmorpholine-N-oxide and water exceeds 93:7, the dissolution temperature may increase and thus cellulose may decompose when dissolved. On the other hand, if the weight thereof is less than 85:15, the dissolution performance of the solvent may deteriorate, making it difficult to dissolve cellulose.

Discharging the spinning dope from a spinneret may be performed at a spinning temperature of 100 to 110° C. If the spinning temperature is lower than 100° C., the flowability of the spinning dope may become poor, and thus the discharge performance from the spinning nozzle may deteriorate. On the other hand, if the spinning temperature is higher than 110° C., the viscosity of the spinning dope decreases, and thus the discharge performance from the spinning nozzle may deteriorate.

Also, the lyocell spinning dope is spun using a spinneret having about 500 to 4,000 holes, whereby the lyocell multifilament according to the present invention may include about 500 to 4000 monofilaments.

[(S2)]

(S2) is a step of coagulating the lyocell spinning dope spun in (S1) to obtain the coagulated lyocell multifilament. The coagulating of (S2) may include primary coagulation using air quenching (Q/A) by supplying the spun lyocell spinning dope with cold air and secondary coagulation by placing the primarily coagulated spinning dope in a coagulation solution.

After the discharge of the spinning dope through the donut-shaped spinneret in (S1), the spinning dope may pass through the air gap zone between the spinneret and the coagulation bath. In the air gap zone, cold air is supplied from an air cooling part positioned inside the donut-shaped spinneret toward the outside of the spinneret, whereby the spinning dope may be primarily coagulated through air quenching using cold air.

The factors that affect the properties of the lyocell multifilament in the primary coagulation process include the temperature and the air flow rate of cold air in the air gap zone. The coagulating in (S2) may be carried out by supplying the spinning dope with cold air at a temperature of 4 to 15° C. and an air flow rate of 70 to 90 m³/hr.

If the temperature of the cold air is lower than 4° C. in the primary coagulation process, the surface of the spinneret may be cooled and the cross-section of the lyocell multifilament may become non-uniform, and spinning processability may deteriorate. On the other hand, if the temperature thereof is higher than 15° C., primary coagulation using cold air is not sufficient, and thus spinning processability may deteriorate. Also, if the air flow rate of the cold air in the primary coagulation process is less than 70 m³/hr, primary coagulation using cold air is not sufficient, and thus spinning processability may deteriorate, undesirably causing yarn breakage. On the other hand, if the air flow rate thereof exceeds 90 m³/hr, it is difficult to realize the low-strength properties of the fibers.

After the primary coagulation using air quenching, the spinning dope is placed in the coagulation bath containing a coagulation solution, so that secondary coagulation is carried out. For appropriate secondary coagulation, the temperature of the coagulation solution may be 30° C. or less. This is because the secondary coagulation temperature is not excessively high, and thus the coagulation rate is appropriately maintained.

The coagulation solution is not particularly limited because it may be prepared so as to have a typical composition in the art to which the present invention belongs.

[(S3)]

(S3) is a step of water-washing the lyocell multifilament coagulated in (S2).

Specifically, the lyocell multifilament coagulated in (S2) is fed into a draw roller and then into a water-washing bath and is thus water-washed.

In the step of water-washing the multifilament, a water-washing solution at 0 to 100° C. may be used, taking into consideration the recovery and reuse of the solvent after the water-washing process. The water-washing solution may include water, and may further include other additives as necessary.

[(S4)]

(S4) is a step of oil-treating the lyocell multifilament water-washed in (S3) and then drying it.

Oil treatment is performed in a manner in which the multifilament is completely immersed in oil and the amount of oil attached to the multifilament is maintained uniform by squeezing rollers provided to the entry and release rolls of an oil treatment device. The oil functions to reduce the friction of the filaments upon contact with the drying roller and the guide and in the crimping process, and also facilitates the formation of the crimps between the fibers.

The lyocell monofilaments, which constitute the lyocell multifilament prepared through (S1) to (S4), have a strength of 2.0 to 3.5 g/d, thus decreasing the strength of the final lyocell material for the cigarette filter, thereby increasing the cuttability of the cigarette filter, ultimately increasing processing efficiency during the manufacture of the cigarette filter.

If the strength of the lyocell monofilaments is less than 2.0 g/d, the lyocell monofilaments cannot endure fiber manufacturing conditions, thus deteriorating spinning processability. On the other hand, if the strength thereof exceeds 3.5 g/d, the strength of the lyocell material for a cigarette filter resulting from crimping post-processing is increased, thus deteriorating processing efficiency during the manufacture of the cigarette filter.

Here, the monofilaments are individual filaments separated from the multifilament provided in fiber form through coagulation, water washing and oil treatment after discharge through the holes in the spinneret, and the strength of the monofilaments refers to the strength of each filament separated from the fibered multifilament.

The lyocell monofilaments have a fineness of 1.0 to 8.0 denier. If the fineness of the monofilaments is less than 1.0 denier, the suction resistance of the cigarette filter is too high. On the other hand, if the fineness thereof exceeds 8.0 denier, the suction resistance of the cigarette filter is too low. Taking into consideration these properties, the fineness of the fibers varies depending on the kind of cigarette. The fineness may be selectively applied depending on the kind of cigarette within the above fineness range.

The lyocell monofilaments may have an elongation of 5 to 13%. If the elongation thereof is less than 5%, processing efficiency during the manufacture of the cigarette filter may decrease. On the other hand, if the elongation thereof exceeds 13%, processing efficiency during the manufacture of the cigarette filter may become satisfactory, but it may be difficult to exhibit properties due to the processing characteristics in the preparation of the monofilaments.

[(S5)]

(S5) is a step of crimping the lyocell multifilament obtained in (S4) to obtain a crimped tow.

Crimping is a process of forming crimps in the multifilament, and a crimped tow having 15 to 30 crimps per inch may be obtained through crimping using a stuffer box.

In (S5), crimping is performed by applying steam and pressure to the lyocell multifilament.

Specifically, crimping using a stuffer box is carried out in a manner in which the lyocell multifilament is supplied with steam at 0.1 to 1.0 kgf/cm² to raise the temperature thereof when passing through a steam box, and is then pressed at a pressure of 1.5 to 2.0 kgf/cm² using a press roller and is thereby crimped.

If the amount of supplied steam is less than 0.1 kgf/cm², crimps are not efficiently formed. On the other hand, if the amount thereof exceeds 1.0 kgf/cm², the temperature in the stuffer box is raised to 120° C. or higher, and thus the filaments are attached to each other and do not pass through the stuffer box. Also, if the pressure that is applied to the press roller is less than 1.5 kgf/cm², the desired number of crimps is not formed. On the other hand, if the pressure applied thereto exceeds 2.0 kgf/cm², the pressing force is too strong, making it difficult to pass the filaments through the stuffer box.

In order to satisfy the properties required of the cigarette filter, the number of crimps per inch is regarded as important. The number of crimps is 15 to 30/inch, and preferably 25 to 30/inch. As such, if the number of crimps is less than 15/inch, it is not easy to open a tow during the manufacture of the cigarette filter, thus causing processing problems. Furthermore, the properties required of the cigarette filter, such as suction resistance, filter hardness, filter removal performance, etc., are unsatisfactory. On the other hand, if the number thereof exceeds 30/inch, non-uniform pressing occurs in the stuffer box and the tow is not efficiently passed, making it difficult to obtain a crimped tow.

The strength of the crimped tow is preferably adjusted to the range of 1 to 2 g/d. If the strength of the crimped tow is less than 1 g/d, it is too low, thus damaging fibers due to the processing tension during the manufacture of the cigarette filter. On the other hand, if the strength thereof exceeds 2 g/d, cuttability may deteriorate in the process of cutting the filter rod during the manufacture of the cigarette filter using the crimped tow, and the cut section of the filter may become poor.

The crimped tow may have an elongation at break of 5 to 7.5%. When the cigarette filter is manufactured using the crimped tow having the above elongation at break, the processing efficiency of the cigarette filter may be increased.

Since the lyocell material for a cigarette filter is biodegradable, a cigarette biodegrades in a short time when discarded and is thus environmentally friendly. Furthermore, the lyocell material for a cigarette filter exhibits low-strength characteristics compared to conventional materials for cigarette filters, and thus cuttability is increased in the process of cutting the cigarette filter, ultimately increasing overall processing efficiency during the manufacture of the cigarette filter, including improvements in production rate and cigarette filter preparation yield.

MODE FOR INVENTION

A better understanding of the present invention may be obtained through the following examples, which are set forth to illustrate, but are not to be construed as limiting the scope of the present invention.

Example 1

S1: cellulose pulp having 93.9% of alpha-cellulose with a degree of polymerization (DPw) of 820 was mixed with a NMMO/$H_2O$ mixed solvent (weight ratio: 90/10) containing 0.01 wt % of propyl gallate, thus preparing a spinning dope having 10 wt % of cellulose pulp (the concentration of the cellulose pulp: 10%, which means that the concentration of the spinning dope is 10%).

The spinning dope was maintained at a spinning temperature of 105° C. at the spinning nozzle of a donut-shaped spinneret, and was then spun while adjusting the discharge amount and the spinning rate of the spinning dope so that the monofilaments for a final lyocell multifilament had a strength of 2.9 g/d, an elongation of 12.1%, and a fineness of 3 denier.

S2: The spinning dope in filament form discharged from the spinning nozzle was supplied to the coagulation solution in the coagulation bath via the air gap zone. In the air gap zone, the spinning dope was primarily coagulated using cold air at a temperature of 8° C. and an air flow rate of 80 $m^3$/hr. Also, the coagulation solution had a temperature of 25° C. and was composed of 85 wt % water and 15 wt % NMMO. The concentration of the coagulation solution was continuously monitored using a sensor and a refractometer.

S3: The filaments drawn in the air layer through a draw roller were water-washed using a water-washing solution sprayed using a water-washing device, thereby removing residual NMMO.

S4: The filaments were thoroughly impregnated with oil and then squeezed so that the filaments had an oil content of 0.2%, and were then dried at 150° C. using a drying roller, thus obtaining a lyocell multifilament.

S5: The lyocell multifilament obtained in S4 was raised in temperature while passing through a steam box and was then crimped in a stuffer box via a press roller, yielding a crimped lyocell tow. The steam was supplied at 0.1 kgf/$cm^2$, the pressure of the press roller was set to 1.5 kgf/$cm^2$, and the number of formed crimps was 25 (ea/inch).

Examples 2 to 9 and Comparative Examples 1 to 6

Lyocell materials for cigarette filters were prepared in the same manner as in Example 1, with the exception that the concentration of the spinning dope, spinning temperature, air flow rate upon air quenching and the like were set as shown in Table 1 below.

Manufacture of Cigarette Filters Using Examples 1 to 7 and Comparative Examples 1 to 6

Cigarette filters were manufactured using the lyocell materials of the examples and comparative examples. The lyocell material of each of Examples 1 to 7 and Comparative Examples 1 to 6 was opened using a cigarette filter plug winding device, impregnated with a typical curing agent for a cigarette filter, and formed in a rod shape using a filter winding paper, which was then cut to a length of 120 mm, thus manufacturing a cigarette filter.

In Comparative Examples 1, 3 and 5, the lyocell multifilament suitable for a lyocell material for a cigarette filter could not be prepared, attributable to poor spinnability, and thus a crimped tow could not be obtained, making it impossible to manufacture a cigarette filter.

The strength, elongation and fineness of the monofilaments were measured through the following methods.

Separation of Monofilament Specimen

The lyocell multifilament specimen obtained in S4 was preliminarily dried at 110° C. for 2 hr so as to attain an official regain or less, and was allowed to stand under standard conditions of KSK 0901 (standard conditions in textile laboratory) for 24 hr or longer to reach a water equilibrium state, followed by separating monofilaments from the multifilament specimen.

Tensile Strength (g/d) and Elongation at Break (%)

The tensile strength and elongation at break of the monofilament specimen were measured at a tensile speed of 60 mm/min using a low-speed elongation tensile tester (made by Instron).

Fineness (De) of Monofilament

The monofilament specimen was placed on a slide glass and then covered with a cover glass, and the thickness of the specimen was measured using an optical microscope, and was then converted via calculation into fineness using the specific gravity of the specimen.

Also, the spinnability upon manufacturing the lyocell multifilament of the examples and comparative examples was evaluated as follows.

Evaluation of Spinnability

The spinnability was evaluated to be good or poor depending on whether the yarn of the tow discharged from the spinneret was liable to breakage.

Good: no breakage of the yarn in the tow discharged from the spinneret

Poor: breakage of the yarn in the tow discharged from the spinneret

Also, the lyocell materials of the examples and comparative examples were measured for the number of crimps, tensile strength (g/d) and elongation at break (%) through the following methods. The results are shown in Table 1 below.

Number of Crimps of Crimped Tow

According to KS K 0326, twenty fiber specimens were taken from a few portions where crimps were not damaged, placed on a prepared glossy paper sheet (spacing distance 25 mm), and added with an additive comprising celluloid in 4~5% amyl acetate so that each specimen was extended by (255)% relative to the spacing distance, after which the specimens were allowed to stand, and thus the adhesive was dried. The number of crimps of each specimen was counted when applying a primary load of 1.96/1000 cN (2 mgf) per 1 D using a crimp tester, and the number of crimps in 25 mm was determined and averaged to one decimal place. The primary load was 1.96/1000 cN (2 mgf) per 1 denier.

Tensile Strength (g/d) and Elongation at Break (%) of Crimped Tow

As for the tensile strength and elongation at break, the crimped tow specimen was preliminarily dried at 110° C. for 2 hr so as to attain an official regain or less, and was allowed to stand under standard conditions of KSK 0901 (standard conditions in textile laboratories) for 24 hr or longer to reach a water equilibrium state, and the short fibers of the tow sample were measured at a tensile speed of 60 mm/min using a low-speed elongation tensile tester (made by Instron).

Also, the cut sections of the test examples and comparative test examples were observed and the rate of production of cigarette filters was measured as follows.

Observation of Cut Section (with Naked Eye)

The cut section was observed with the naked eye, and was evaluated to be good or poor.

Good: when cut section of the filter rod is smooth

Poor: when cut section of the filter rod is not smooth and fibers aggregate or protrude Rate of Production of Cigarette Filter (rods/min)

The number of filter rods produced per min was taken as the rate of production of the cigarette filter.

As is apparent from the results of Table 1, in Comparative Examples 1, 3 and 5 in which the concentration of the spinning dope, the spinning temperature, or the air flow rate in the air quenching was less than an appropriate level, the strength and elongation of the monofilaments fell outside the ranges of the invention, and thus the monofilaments were not spun in the form of a tow due to poor spinnability, making it impossible to manufacture a lyocell material for a cigarette filter.

Also, in the case where the concentration of the spinning dope was higher than an appropriate level, as in Comparative Example 2, the strength of the monofilaments formed upon spinning the spinning dope was high, and thus the lyocell filter had good elongation at break and spinnability but high tensile strength. Accordingly, in the case where the above lyocell filter is used to manufacture a cigarette filter, it is difficult to perform the cutting process attributable to high tensile strength, undesirably causing a poor cut section of the cigarette filter and a decreased rate of production of the cigarette filter.

Also, in the case where the spinning temperature was higher than an appropriate level, as in Comparative Example 4, the strength of the monofilaments formed upon spinning the spinning dope was high and thus the lyocell filter had good spinnability but the tensile strength and elongation at break thereof were high. In the case where the above lyocell

TABLE 1

| | Spinning | | Upon air quenching, | Monofilament | | |
|---|---|---|---|---|---|---|
| | dope conc. (%) | Spinning temp. (° C.) | air flow rate (m³/hr) | Strength (g/d) | Elong. (%) | Fineness (De) |
| Ex. 1 | 10 | 105 | 80 | 2.9 | 12.1 | 3 |
| Ex. 2 | 8 | 105 | 80 | 2.8 | 8.9 | 3 |
| Ex. 3 | 11 | 105 | 80 | 3.5 | 12.7 | 3 |
| Ex. 4 | 10 | 100 | 80 | 2.8 | 7.9 | 3 |
| Ex. 5 | 10 | 110 | 80 | 2.9 | 9.9 | 3 |
| Ex. 6 | 10 | 105 | 70 | 2.9 | 11.5 | 3 |
| Ex. 7 | 10 | 105 | 90 | 3.2 | 12.3 | 3 |
| Ex. 8 | 7.5 | 100 | 70 | 2.1 | 8.1 | 3 |
| Ex. 9 | 7.8 | 100 | 70 | 2.5 | 8.1 | 3 |
| C. Ex. 1 | 7 | 105 | 80 | — | — | — |
| C. Ex. 2 | 12 | 105 | 80 | 5.7 | 10.9 | 3 |
| C. Ex. 3 | 12 | 95 | 80 | — | — | — |
| C. Ex. 4 | 12 | 115 | 80 | 7.8 | 13.3 | 3 |
| C. Ex. 5 | 12 | 105 | 60 | — | — | — |
| C. Ex. 6 | 12 | 105 | 100 | 6.3 | 11.5 | 3 |

| | Crimped tow | | | | | Cigarette filter |
|---|---|---|---|---|---|---|
| | No. of crimps (ea/inch) | Tensile strength (g/denier) | Elong. at break (%) | Spinnability | Cut section | production rate (rods/min) |
| Ex. 1 | 25 | 1.37 | 7.1 | Good | Good | 3000 or more |
| Ex. 2 | 25 | 1.32 | 5.5 | Good | Good | 3000 or more |
| Ex. 3 | 25 | 1.65 | 7.4 | Good | Good | 3000 or more |
| Ex. 4 | 25 | 1.32 | 5.0 | Good | Good | 3000 or more |
| Ex. 5 | 25 | 1.40 | 6.0 | Good | Good | 3000 or more |
| Ex. 6 | 25 | 1.40 | 6.8 | Good | Good | 3000 or more |
| Ex. 7 | 25 | 1.50 | 7.2 | Good | Good | 3000 or more |
| Ex. 8 | 25 | 1.1 | 7.0 | Good | Good | 3000 or more |
| Ex. 9 | 25 | 1.2 | 7.0 | Good | Good | 3000 or more |
| C. Ex. 1 | | — | — | Poor | — | — |
| C. Ex. 2 | 25 | 2.7 | 6.5 | Good | Poor | 500 |
| C. Ex. 3 | | — | — | Poor | — | — |
| C. Ex. 4 | 25 | 3.70 | 7.7 | Good | Poor | 500 |
| C. Ex. 5 | | — | — | Poor | — | — |
| C. Ex. 6 | 25 | 3.0 | 6.8 | Good | Poor | 500 | filter is used to manufacture a cigarette filter, it is difficult to perform the cutting process attributable to high tensile strength and elongation at break, undesirably causing a poor cut section of the cigarette filter and a decreased rate of production of the cigarette filter.

Also, in the case where the air flow rate in the air quenching was higher than an appropriate level, as in Comparative Example 6, the strength of the monofilaments formed upon spinning the spinning dope was high, and thus the lyocell filter had good elongation at break and spinnability but high tensile strength. In the case where the above lyocell filter is used to manufacture a cigarette filter, it is difficult to perform the cutting process attributable to high tensile strength, undesirably resulting in a poor cut section of the cigarette filter and a decreased rate of production of the cigarette filter.

Based on the results of Examples 1 to 9, the lyocell filter, made of the multifilament comprising lyocell monofilaments satisfying the strength, elongation, fineness and number prescribed in the present invention, can exhibit low tensile strength, appropriate elongation at break, and good spinnability. When using such a lyocell filter, the resulting cigarette filter can manifest a good cut section and enables an increase in the rate of production of cigarette filters. Hence, the lyocell material of the invention is considered to be suitable for use as a tow for a cigarette filter.

The invention claimed is:

1. A method of preparing a lyocell material for a cigarette filter, comprising:
   (S1) spinning a lyocell spinning dope including cellulose pulp and an N-methylmorpholine-N-oxide (NMMO) aqueous solution, in which a concentration of the cellulose pulp is 8 to 11%;
   (S2) coagulating the lyocell spinning dope spun in (S1), thus obtaining a coagulated lyocell multifilament;
   (S3) water-washing the lyocell multifilament coagulated in (S2);
   (S4) oil-treating and drying the lyocell multifilament water-washed in (S3); and
   (S5) crimping the lyocell multifilament oil-treated in (S4), thus preparing a crimped tow,
   wherein in (S2), the coagulating comprises primary coagulation using air quenching (Q/A) by supplying the spun lyocell spinning dope with cold air at a temperature of 4 to 15° C. and an air flow rate of 70 to 90 m$^3$/hr, and secondary coagulation by placing the primarily coagulated spinning dope in a coagulation solution,
   wherein in (S5), the crimping is performed so as to form 25 to 30 crimps per inch in the lyocell multifilament obtained in (S4), and
   wherein (S1) to (S5) are performed so that the crimped tow of (S5) has a tensile strength of 1 to 2 g/d.

2. The method of claim 1, wherein in (S1), the cellulose pulp comprises 85 to 97 wt % of alpha-cellulose and has a degree of polymerization (DPw) of 600 to 1700.

3. The method of claim 1, wherein in (S1), the spinning is performed at 100 to 110° C.

4. The method of claim 1, wherein the coagulation solution in the secondary coagulation has a temperature of 30° C. or less.

5. The method of claim 1, wherein the crimping is performed by supplying steam to the lyocell multifilament and applying pressure thereto.

6. The method of claim 5, wherein the crimping is performed by supplying the lyocell multifilament with steam at a pressure of 0.1 to 1.0 kgf/cm$^2$ and pressing the lyocell multifilament using a press roller at a pressure of 1.5 to 2.0 kgf/cm$^2$.

7. The method of claim 1, wherein (S1) to (S4) are performed so that the lyocell monofilaments obtained in (S4) have a fineness of 1.0 to 8.0 denier.

8. The method of claim 1, wherein (S1) to (S4) are performed so that the lyocell monofilaments obtained in (S4) have an elongation of 5 to 13%.

9. A method of preparing a lyocell material for a cigarette filter, comprising:
   (S1) spinning a lyocell spinning dope including cellulose pulp and an N-methylmorpholine-N-oxide (NMMO) aqueous solution, in which a concentration of the cellulose pulp is 8 to 11%;
   (S2) coagulating the lyocell spinning dope spun in (S1), thus obtaining a coagulated lyocell multifilament;
   (S3) water-washing the lyocell multifilament coagulated in (S2);
   (S4) oil-treating and drying the lyocell multifilament water-washed in (S3); and
   (S5) crimping the lyocell multifilament oil-treated in (S4), thus preparing a crimped tow,
   wherein in (S2), the coagulating comprises primary coagulation using air quenching (Q/A) by supplying the spun lyocell spinning dope with cold air at a temperature of 4 to 15° C. and an air flow rate of 70 to 90 m$^3$/hr, and secondary coagulation by placing the primarily coagulated lyocell spinning dope in a coagulation solution,
   wherein in (S5), the crimping is performed so as to form 25 to 30 crimps per inch in the lyocell multifilament obtained in (S4), and
   wherein (S1) to (S4) are performed so that monofilaments of the lyocell multifilament obtained in (S4) have a strength of 2.0 to 3.5 g/d.

10. The method of claim 9, wherein in (S1), the cellulose pulp comprises 85 to 97 wt % of alpha-cellulose and has a degree of polymerization (DPw) of 600 to 1700.

11. The method of claim 9, wherein in (S1), the spinning is performed at 100 to 110° C.

12. The method of claim 9, wherein the coagulation solution in the secondary coagulation has a temperature of 30° C. or less.

13. The method of claim 9, wherein the crimping is performed by supplying steam to the lyocell multifilament and applying pressure thereto.

14. The method of claim 13, wherein the crimping is performed by supplying the lyocell multifilament with steam at a pressure of 0.1 to 1.0 kgf/cm$^2$ and pressing the lyocell multifilament using a press roller at a pressure of 1.5 to 2.0 kgf/cm$^2$.

15. The method of claim 9, wherein (S1) to (S4) are performed so that the lyocell monofilaments obtained in (S4) have a fineness of 1.0 to 8.0 denier.

16. The method of claim 9, wherein (S1) to (S4) are performed so that the lyocell monofilaments obtained in (S4) have an elongation of 5 to 13%.

* * * * *